US011994060B2

(12) United States Patent
Makartchouk et al.

(10) Patent No.: US 11,994,060 B2
(45) Date of Patent: May 28, 2024

(54) ENGINE WITH HIGH TORQUE MECHANISM

(71) Applicant: International Engine Intellectual Property Company, LLC, Lisle, IL (US)

(72) Inventors: Andrei Makartchouk, Hinsdale, IL (US); Peirong Jia, Naperville, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 159 days.

(21) Appl. No.: 17/734,917

(22) Filed: May 2, 2022

(65) Prior Publication Data

US 2023/0349320 A1 Nov. 2, 2023

(51) Int. Cl.
*F02B 75/32* (2006.01)
*F01B 9/02* (2006.01)

(52) U.S. Cl.
CPC ................ *F02B 75/32* (2013.01); *F01B 9/02* (2013.01)

(58) Field of Classification Search
CPC ........ F02B 75/32; F02B 2275/36; F01B 9/02; F16C 7/023; F16H 21/18
See application file for complete search history.

(56) References Cited

U.S. PATENT DOCUMENTS 1,597,080 A 8/1926 Lewis
6,615,773 B2 9/2003 Moteki et al.
10,927,754 B2 2/2021 Makartchouk
2009/0038588 A1 2/2009 Hiyoshi et al.
2018/0372147 A1* 12/2018 Zahdeh .................... F16C 7/06

FOREIGN PATENT DOCUMENTS

DE 612405 C 4/1935
EP 1126144 A2 8/2001
GB 2273327 A 6/1994

OTHER PUBLICATIONS

International Search Report and Written Opinion for PCT/US2023/014887, dated May 23, 2023 (10 pages).

* cited by examiner

*Primary Examiner* — Jacob M Amick
(74) *Attorney, Agent, or Firm* — Mark C. Bach; Umang Khanna

(57) ABSTRACT

A high torque mechanism connected to a piston arranged within a cylinder and connected to a connecting rod for an engine may include features of a triangular link and a guide arm. The high torque mechanism may provide an upgrade to the conventional hardware with new elements that provide higher torque and thus allowing a reduction of fuel consumption versus a conventional engine of the same power. The high torque mechanism may include a triangular link, a crankshaft, and a guide arm. The connecting rod may be connected to the piston and a first joint on the triangular link. The guide arm may be connected to a second joint on the triangular link and a guide pivot point. The crankshaft may be connected to a third joint on the triangular link and a crank pivot point. The triangular link and the guide arm make the engine torque considerably higher in various crank ranges where the in-cylinder combustion pressure is high.

14 Claims, 8 Drawing Sheets

ENGINE WITH HIGH TORQUE MECHANISM

TECHNICAL FIELD

Aspects described herein generally relate to engine hardware. More specifically, aspects of this disclosure relate to conventional engines that provide high torque and reduced fuel consumption.

BACKGROUND

A common desire for conventional engines is to increase torque, thereby creating higher engine efficiency, reducing fuel consumption, and reducing emissions. Accordingly, there is an unmet need for an arrangement and method for increasing torque in an engine and making the engine more efficient. Additionally, there is an unmet need for an arrangement and method for reducing fuel consumption and reducing emissions in an engine.

SUMMARY

An engine with a piston arranged within a cylinder may comprise: a connecting rod, a triangular link, a guide arm, and a crankshaft. The connecting rod may have an upper end and a lower end, and may be connected at its upper end to the piston. The triangular link may have a first joint located at a first corner of the triangular link, a second joint located at a second corner of the triangular link, and a third joint located at a third corner of the triangular link. The first joint may be connected to the lower end of the connecting rod. The guide arm may have a first end and a second end, and connected at its first end to the third joint of the triangular link. The guide arm may be controlled in rotation thereby about a guide pivot point at the second end. The rotation of the guide arm may control a direction of motion of the triangular link. The crankshaft may have a first end and a second end, and may be connected at its first end to the second joint of the triangular link. The crankshaft may be controlled in rotation thereby about a crank pivot point at the second end.

In additional aspects of the invention, the triangular link may include a window that results in a reduction of mass of the triangular link. Additionally, the engine may further include a first gear connected to the crankshaft at the crank pivot point and a second gear connected to the guide arm at the guide pivot point, the second gear engaged with the first gear. The first gear and the second gear may be circular or elliptical. The crank pivot point may be located at a central position of the first gear or the crank pivot point may be located off-center a central position of the first gear. The guide pivot point may be located at a central position of the second gear or the guide pivot point may be located off-center a central position of the second gear. The engine may deliver higher torque than an engine omitting at least the triangular link. Additionally, for a same amount of requested torque, a fuel consumption of the engine will be lower than the engine omitting at least the triangular link. Further, the connecting rod may move in a narrow angle with the piston movement, thereby minimizing a side force on the cylinder which reduces the wear of the cylinder, the piston, and a ring of the piston.

In another aspect, a high torque mechanism for use with an engine with a piston arranged within a cylinder, the high torque mechanism may comprise: a connecting rod, a three-point link, a guide arm, and a crankshaft. The connecting rod may have an upper end and a lower end, and may be connected at its upper end to the piston. The three-point link may have a first joint located at a first corner of the three-point link, a second joint located at a second corner of the three-point link, and a third joint located at a third corner of the three-point link, with the first joint connected to the lower end of the connecting rod. The three-point link may include a window that results in a reduction of mass of the three-point link. The guide arm may have a first end and a second end, and may be connected at its first end to the third joint of the three-point link. The guide arm may be controlled in rotation thereby about a guide pivot point at the second end. The rotation of the guide arm may control a direction of motion of the three-point link. The crankshaft may have a first end and a second end, and may be connected at its first end to the second joint of the three-point link. The crankshaft may be controlled in rotation thereby about a crank pivot point at the second end. The high torque mechanism may also include a first gear connected to the crankshaft at the crank pivot point and a second gear connected to the guide arm at the guide pivot point, the second gear engaged with the first gear.

In yet another aspect, a vehicle with a high-torque engine and on-board fuel container, the high-torque engine comprising: a piston arranged within a cylinder, a connecting rod, a triangular link, a guide arm, and a crankshaft. The connecting rod may have an upper end and a lower end, and being connected at its upper end to the piston. The triangular link may have a first joint located at a first corner of the triangular link, a second joint located at a second corner of the triangular link, and a third joint located at a third corner of the triangular link, with the first joint connected to the lower end of the connecting rod. The guide arm may have a first end and a second end, and may be connected at its first end to the third joint of the triangular link. The guide arm may be controlled in rotation thereby about a guide pivot point at the second end, wherein the rotation of the guide arm may control a direction of motion of the triangular link. The crankshaft may have a first end and a second end, and may be connected at its first end to the second joint of the triangular link. The crankshaft may be controlled in rotation thereby about a crank pivot point at the second end.

BRIEF DESCRIPTION OF THE DRAWINGS

The foregoing summary, as well as the following detailed description of exemplary embodiments, is better understood when read in conjunction with the accompanying drawings, which are included by way of example, and not by way of limitation with regard to the claimed invention.

DETAILED DESCRIPTION

According to an aspect of the embodiments, a high torque mechanism may be utilized to for a conventional engine as an upgrade of the conventional kinematics that creates higher engine torque. This upgrade makes the engine more efficient, reduces fuel consumption, and reduces emissions. The high torque mechanism will upgrade the conventional engine hardware with new components allowing a reduction of fuel consumption versus a conventional engine of the same power.

According to another aspect of the embodiments, a high torque mechanism may be utilized with an engine comprising a piston and a cylinder arrangement. A vehicle may utilize the engine with the high torque mechanism and an on-board fuel container. Other end devices may utilize the engine with the high torque mechanism.

A high torque mechanism connected to a piston arranged within a cylinder and connected to a connecting rod for an engine may include features of a three-point link and a guide arm. The three-point link may be a triangular link or other shaped three-point link. The high torque mechanism may provide an upgrade to the conventional hardware with new elements that provide higher torque and thus allow a reduction of fuel consumption versus a conventional engine of the same power. The high torque mechanism may include a triangular link, a crankshaft, and a guide arm. The connecting rod may be connected to the piston and a first joint on the triangular link. The guide arm may be connected to a second joint on the triangular link and a guide pivot point. The crankshaft may be connected to a third joint on the triangular link and a crank pivot point. The triangular link and the guide arm make the engine torque considerably higher in various crank ranges where the in-cylinder combustion pressure is high.

Figure 1:
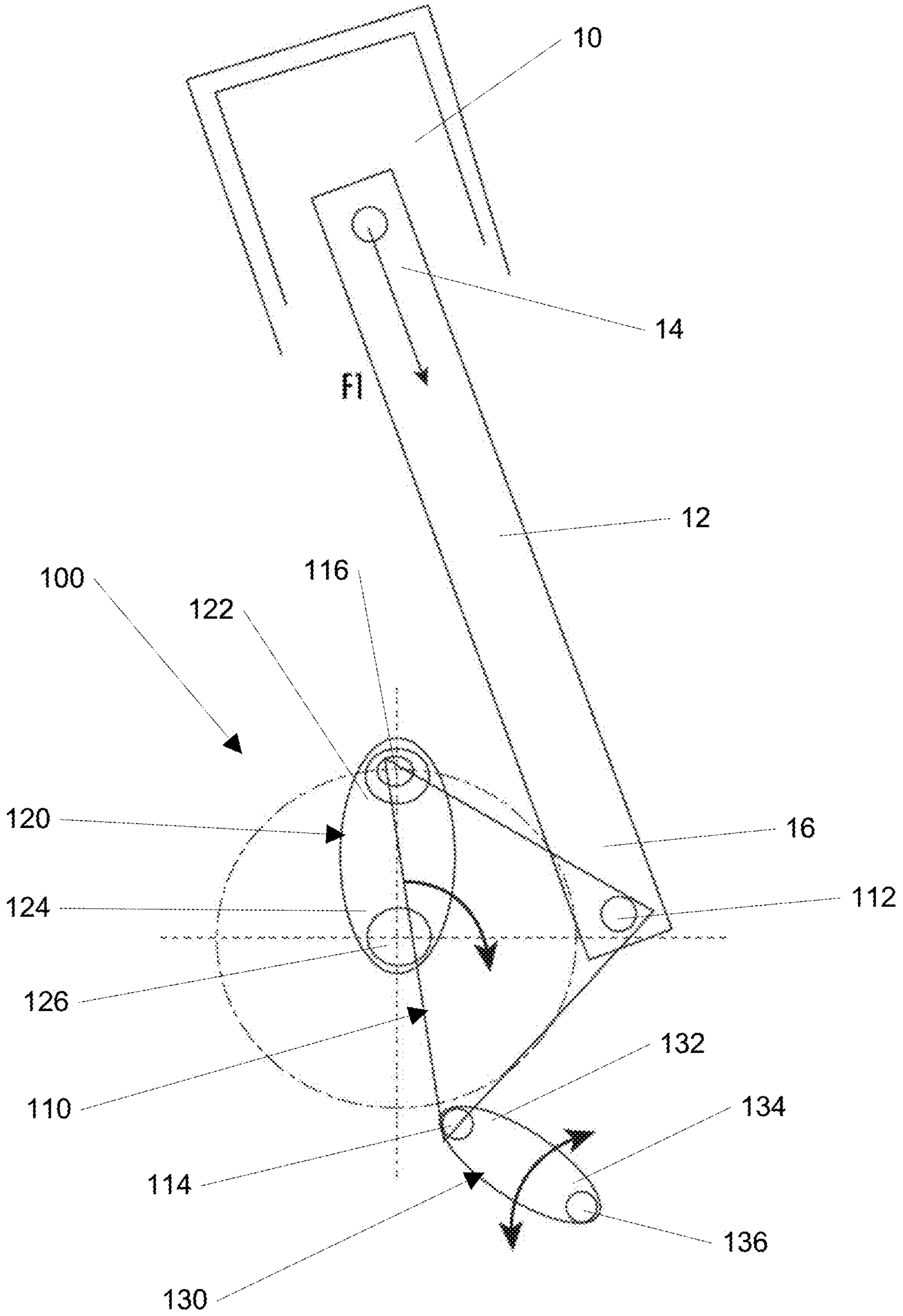
FIG. 1 shows an end view of an embodiment of a high torque mechanism of an engine in accordance with an embodiment.

FIG. 1 shows an exemplary high torque mechanism 100 connected to a piston 10 arranged within a cylinder and connected to a connecting rod 12 for an engine. The high torque mechanism 100 may be utilized with any piston 10, cylinder, and connecting rod 12 arrangement for an engine. The high torque mechanism 100 may be utilized with any engine utilized within the art. The engine with the high torque mechanism 100 may be utilized with other components, such as an on-board fuel container, thereby resulting in improved fuel consumption so more torque can be outputted by the same amount of fuel stored in the on-board fuel container. The engine with the high torque mechanism 100 may be utilized with any end device, such as vehicles (i.e. automobiles, trucks, airplanes, trains, golf carts, etc.). The high torque mechanism 100 may provide an upgrade to the conventional hardware with new elements that provide higher torque and thus allowing a reduction of fuel consumption versus a conventional engine of the same power.

As illustrated in FIG. 1, the high torque mechanism 100 may include a triangular link 110, a crankshaft 120, and a guide arm 130. FIG. 1 illustrates the components for the engine of the triangular link 110 and the guide arm 130. The triangular link 110 may create a unique combination of force distribution that would not be possible in a conventional engine or with any other link-like engine kinematics. The triangular link 110 and the guide arm 130 make the engine torque considerably higher in the crank range between top-down-center (TDC) and 45 degrees where the in-cylinder combustion pressure is high.

The high torque mechanism 100 may be connected to a connecting rod 12 that is connected to the piston 10. The connecting rod 12 may have an upper end 14 and a lower end 16 opposite the upper end 14. The upper end 14 may be connected to the piston 10. The lower end 16 may be connected to a triangular link 110. The triangular link 110 may also be connected to the crankshaft 120 and the guide arm 130.

As illustrated in FIG. 1, the triangular link 110 may be a triangular-shaped link that includes three joints located at the corners of triangular link 110. The triangular link 110 may also be a three-point link in other shapes. For example, the three-point link may be in the shape of an oval, circle, or elliptical shape with three joints located throughout the shape of the oval, circle, or ellipse. The three-point link may be in the shape of a polygon with corners, such as a rectangle, square, pentagon, heptagon, octagon, etc. For example, a rectangle may be utilized with three joints located at three of the corners of the triangular link. Other shapes and polygons may be utilized for the three-point link/triangular link 110.

The triangular link 110 (and three-point link) may include three different joints. A first joint 112 may be located at a first corner of the triangular link 110. A second joint 114 may be located at a second corner of the triangular link 110. A third joint 116 may be located at a third corner of the triangular link 110. The first joint 112 may be connected to the lower end 16 of the connecting rod 12. The second joint 114 may be connected to the guide arm 130. The third joint 116 may be connected to the crankshaft 120.

The triangular link 110 may be various shaped triangles without departing from the invention. For example, the triangular link 110 may be any of a right triangle, an acute triangle, or an obtuse triangle. The triangular link 110 may also be any of an equilateral triangle, an isosceles triangle, or a scalene triangle. Additionally, each of the joints 112, 114, 116 may be located at any of the corners of the various shaped triangles, and therefore, each of the various connections to the connecting rod 12, the guide arm 130, and the crankshaft 120 may be located at any of the corners of the various shaped triangles. For example, if the triangular link 110 is a right triangle, the first joint 112 connected to the connecting rod 12 may be located at the corner with the right angle, or the second joint 114 connected to the guide arm 130 may be located at the corner with the right angle, or the third joint 116 connected to the crankshaft 120 may be located at the corner with the right angle. Similarly, if the triangular link 110 is an obtuse triangle, the first joint 112 connected to the connecting rod 12 may be located at the corner with the obtuse angle, or the second joint 114 connected to the guide arm 130 may be located at the corner with the obtuse angle, or the third joint 116 connected to the crankshaft 120 may be located at the corner with the obtuse angle. Similarly again, if the triangular link 110 is an isosceles triangle, the first joint 112 connected to the connecting rod 12 and the second joint 114 connected to the guide arm 130 may be located at the corners with equal angles, or the first joint 112 connected to the connecting rod 12 and the third joint 116 connected to the crankshaft 120 may be located at the corners with equal angles, or the second joint 114 connected to the guide arm 130 and the third joint 116 connected to the crankshaft 120 may be located at the corners with equal angles.

Additionally, the triangular link 110 as a polygon-shaped three-point link, such as a rectangle, square, pentagon, heptagon, octagon, etc., may utilize three of the corners for each of the three joints, with the ability to rotate joints using any three of the four corners for the joints. This may provide potential adjustments or modifications of the joint locations and linkages using a polygon-shaped three-point link. For example, the three joints may utilize a first corner, second corner, and third corner of the rectangle in a first configuration; while the three joints may utilize the first corner, second corner, and fourth corner of the rectangle in a second configuration. The polygon-shaped three-point link be able to provide the ability to modify the engine linkage kinematic characteristics for various situations. The triangular link or three-point link could be incorporated into any other shape, but position of these three joints versus each other should stay triangular. These three joints should be located versus each other as a triangle with equilateral or scalene shape. However, other triangular shapes may work also and can be presented by other three joint shapes.

The high torque mechanism 100 may also include a guide arm 130 that is connected to the second joint 114 of the triangular link 110. The guide arm 130 may control the direction of motion of the triangular link 110. The guide arm 130 may include a first end 132 and a second end 134 opposite the first end 132. The first end 132 may be connected to the second joint 114 of the triangular link 110. The second end 134 may be connected to a guide pivot point 136. The guide arm 130 may be rotatable about the guide pivot point 136 when the piston 10 and connecting rod 12 move up and down within in the engine. As illustrated in FIG. 1, the guide arm 130 may be rotatable in both the clockwise and counter-clockwise directions about the guide pivot point 136.

The high torque mechanism 100 also includes a crankshaft 120 that is connected to the third joint 116 of the triangular link 110. The crankshaft 120 may include a first end 122 and a second end 124 opposite the first end 122. The first end 122 may be connected to the third joint 116 of the triangular link 110. The second end 124 may be connected to a crank pivot point 126. The crankshaft 120 may be rotatable about the crank pivot point 126 when the piston 10 and connecting rod 12 move up and down within in the engine. As illustrated in FIG. 1, the crankshaft 120 may be rotatable in a clockwise direction about the crank pivot point 126. In another embodiment, the crankshaft 120 may be rotatable in a counterclockwise direction about the crank pivot point 126.

Figure 2:
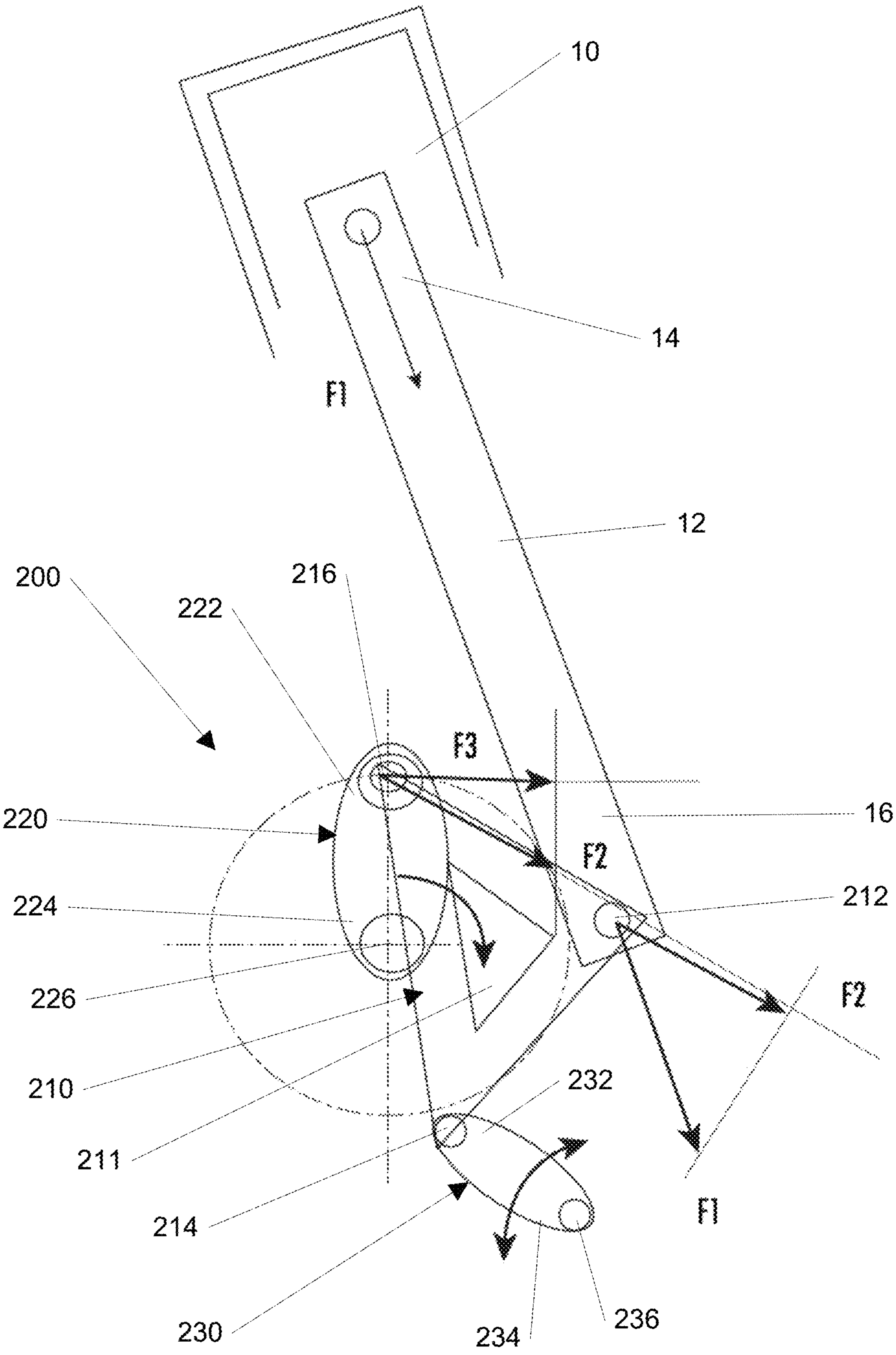
FIG. 2 shows an end view of another embodiment of a high torque mechanism of an engine in accordance with an embodiment.

FIG. 2 illustrates another embodiment of a high torque mechanism 200. For the embodiment of FIG. 2, the features of the high torque mechanism 200 are referred to using similar reference numbers under the “2XX” series of reference numerals, rather than “1XX” as used for the high torque mechanism 100 in the embodiments of FIG. 1. A “1XX” feature may be similar to “2XX” feature. Accordingly, certain features of the high torque mechanism 200 that were already described above with respect to the high torque mechanism 100 of FIG. 1 may be described in lesser detail, or may not be described at all. Further, any combination of the features of the high torque mechanism 100 may be utilized with the high torque mechanism 200. Vice versa, any combination of the features of the high torque mechanism 200 may be utilized with the high torque mechanism 100.

The high torque mechanism 200 of FIG. 2 includes a triangular link 210 with a window 211. The window 211 may be a hole or opening within the triangular link 210. The window 211 may result in a reduction in mass of the triangular link 210. The reduction of mass in moving parts, such as the triangular link 210 with a window 211, within an engine provides parasitic inertia of these moving parts lower. This may help to reduce the side-to-side vibration of the engine. The window 211 may be various shapes as part of the triangular link 210. For example, as illustrated in FIG. 2, the window 211 may be triangular shaped. The window 211 may be other shapes, such a circular, oval, square, rectangular, slot, etc. The window 211 may also include multiple holes or openings in the triangular link 210 to help reduce mass from the triangular link 210.

FIG. 2 also illustrates the force distribution at a top down center location (TDC) for the piston. F1 represents a force on a piston from the combustion process in the cylinder. F3 represents an additionally rotating force that is created by the high torque mechanism 100, 200 that will be applied to the crankshaft 120 at TDC. In a conventional engine, this force (F3) at TDC would be equal to zero. The high torque mechanism 100, 200 delivers considerably higher torque. Therefore, for the same requested torque, the fuel consumption of an engine with the high torque mechanism 100, 200 will be lower than in the engine of conventional design without the high torque mechanism 100, 200.

Figure 3:
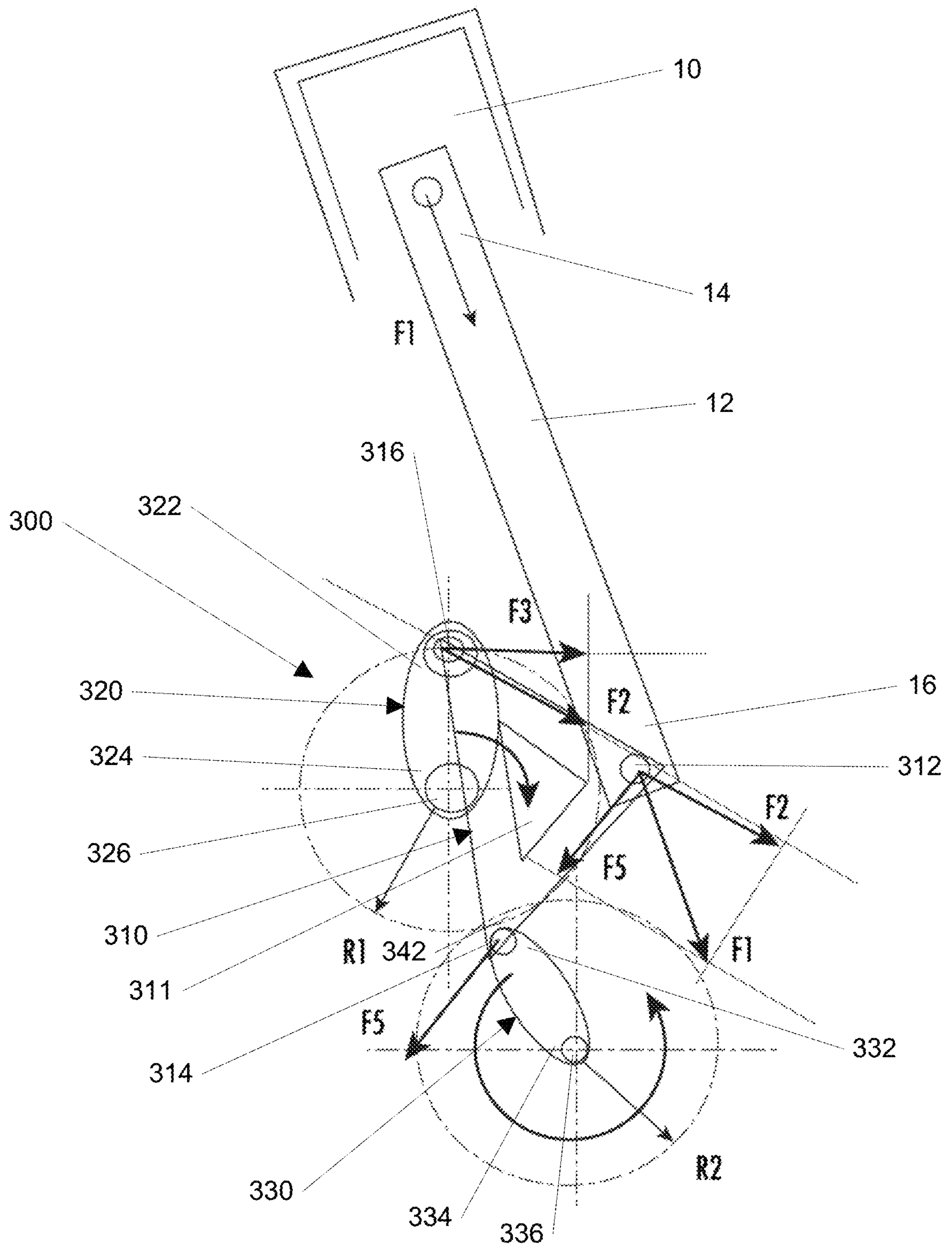
FIG. 3 shows an end view of another embodiment of a high torque mechanism of an engine in accordance with an embodiment.
Figure 4A:
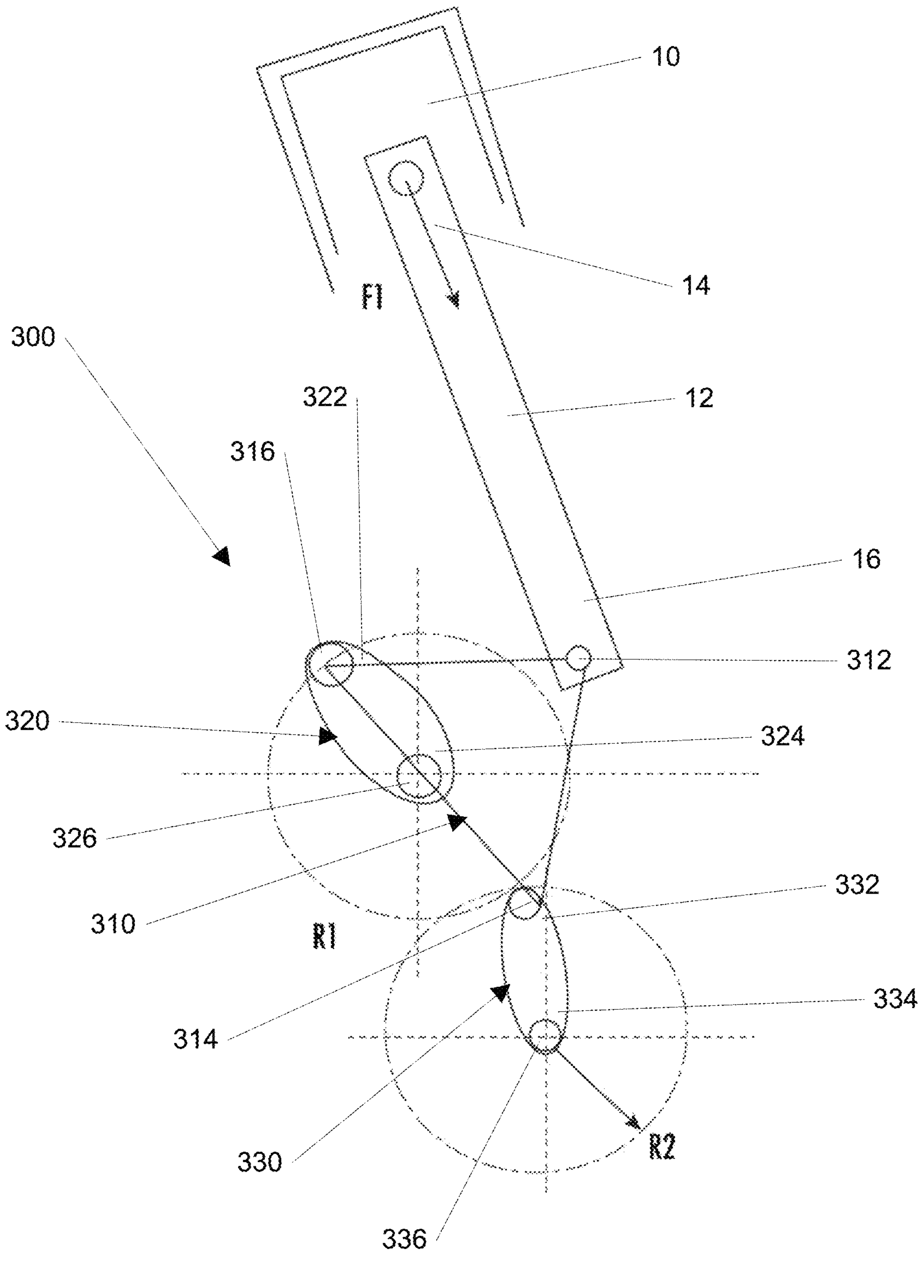
FIG. 4A shows an end view of the high torque mechanism of the engine at top-down-position from FIG. 3 in accordance with an embodiment.
Figure 4B:
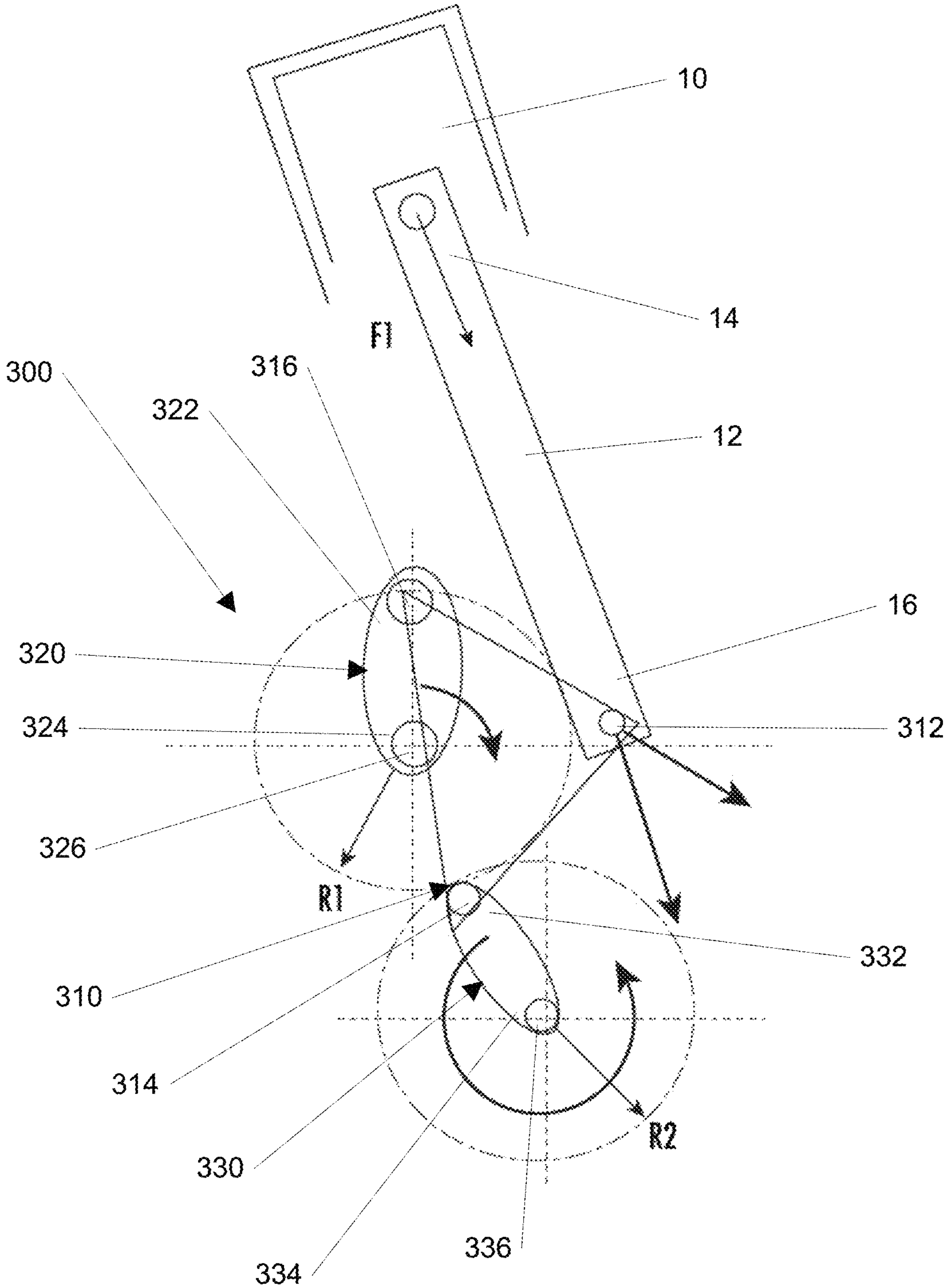
FIG. 4B shows an end view of the high torque mechanism of the engine at a second position from FIG. 3 in accordance with an embodiment.

FIGS. 3, 4A, and 4B illustrate another embodiment of a high torque mechanism 300. For the embodiment of FIGS. 3, 4A, and 4B, the features of the high torque mechanism 300 are referred to using similar reference numbers under the “3XX” series of reference numerals, rather than “1XX” as used for the high torque mechanism 100 in the embodiment of FIG. 1 and “2XX” as used for the high torque mechanism 200 in the embodiment of FIG. 2. A “1XX” and/or “2XX” feature may be similar to “3XX” feature. Accordingly, certain features of the high torque mechanism 300 that were already described above with respect to the high torque mechanism 100 of FIG. 1 and the high torque mechanism 200 of FIG. 2 may be described in lesser detail, or may not be described at all. Further, any combination of the features of the high torque mechanism 300 may be utilized with the high torque mechanisms 100, 200. Vice versa, any combination of the features of the high torque mechanisms 100, 200 may be utilized with the high torque mechanism 300.

FIG. 3 shows an exemplary high torque mechanism 300 connected to a piston 10 arranged within a cylinder and connected to a connecting rod 12 for an engine. FIGS. 4A and 4B illustrate the high torque mechanism 300 at various positions within the piston 10 movement. The high torque mechanism 300 may be utilized with any piston 10, cylinder, and connecting rod 12 arrangement for an engine. The high torque mechanism 300 may be utilized with any engine utilized within the art. The engine with the high torque mechanism 300 may be utilized with any end device, such as vehicles (i.e. automobiles, trucks, airplanes, trains, golf carts, etc.). The high torque mechanism 300 may provide an upgrade to the conventional hardware with new elements that provide higher torque and thus allowing a reduction of fuel consumption versus a conventional engine of the same power.

As illustrated in FIG. 3, the high torque mechanism 300 may include a triangular link 310, a crankshaft 320, a guide arm 330, a first gear 340, and a second gear 350. The high torque mechanism 300 may be connected to a connecting rod 12 that is connected to the piston 10. The connecting rod 12 may have an upper end 14 and a lower end 16 opposite the upper end 14. The upper end 14 may be connected to the piston 10. The lower end 16 may be connected to a triangular link 310. The triangular link 310 may also be connected to the crankshaft 320 and the guide arm 330.

As illustrated in FIG. 3, the triangular link 310 may be a triangular shaped-link that includes three joints located at the corners of triangular link 310. A first joint 312 may be located at a first corner of the triangular link 310. A second joint 314 may be located at a second corner of the triangular link 310. A third joint 316 may be located at a third corner of the triangular link 310. The first joint 312 may be connected to the lower end 16 of the connecting rod 12. The second joint 314 may be connected to the guide arm 330. The third joint 316 may be connected to the crankshaft 320.

The high torque mechanism 300 also includes a guide arm 330 that is connected to the second joint 314 of the triangular link 310. The guide arm 330 may include a first end 332 and a second end 334 opposite the first end 332. The first end 332 may be connected to the second joint 314 of the triangular link 310. The second end 334 may be connected to a guide pivot point 336. The guide arm 330 may be rotatable about the guide pivot point 336 when the piston 10 and connecting rod 12 move up and down within in the engine. As illustrated in FIG. 3, the guide arm 330 may be rotatable in a counter-clockwise direction about the guide pivot point 336.

The high torque mechanism 300 also includes a crankshaft 320 that is connected to the third joint 316 of the triangular link 310. The crankshaft 320 may include a first end 322 and a second end 324 opposite the first end 322. The first end 322 may be connected to the third joint 316 of the triangular link 310. The second end 324 may be connected to a crank pivot point 326. The crankshaft 120 may be rotatable about the crank pivot point 326 when the piston 10 and connecting rod 12 move up and down within in the engine. As illustrated in FIG. 3, the crankshaft 320 may be rotatable in a clockwise direction about the crank pivot point 326. In another embodiment, the crankshaft 320 may be rotatable in a counterclockwise direction about the crank pivot point 326.

Additionally, as illustrated in FIGS. 3, 4A, and 4B, the high torque mechanism 310 may include a first gear 340 and a second gear 350 engaged with each other at point 'A' 342. The first gear 340 may include a radius R1 and the second gear 350 may have a radius R2. The first gear 340 and the second gear 350 may have the same radiuses R1, R2, with R1 equaling R2. In other embodiments, the first gear 340 and the second gear 350 may have different radiuses R1, R2. The first gear 340 may be firmly attached to the crankshaft 320 at the crank pivot point 326. The second gear 350 may be firmly attached to the guide arm 330 at the guide pivot point 336. Based on force distribution with the high torque mechanism 310, Force F1 may be resolved into F1 and F5. F2 may create a useful rotating moment M1 on the crankshaft 320, calculated as M1=F2*R1. Additionally, F5 may create a useful rotating moment M2 on the guide arm 330, calculated as M2=F5*R2. Therefore, the high torque mechanism 310 creates additional force and moment based on the use of the first gear 340 and the second gear 350. See below for an example calculation:

Referencing FIGS. 2 and 3, at a given, same position of elements as shown in FIGS. 2 and 3. In the calculations, the force is made equal to the length measured in mm in FIGS. 2 and 3.

With Reference to FIG. 2 (without a First Gear and a Second Gear)

F3=33 kgf

R1=35 mm

M1=33*35–1155 kgf*mm—Moment from FIG. 2 (without first gear and second gear of FIG. 3)

With Reference to FIG. 3 (with a First Gear 340 and a Second Gear 350)

F3=33/2=16.5 kgf (divided by two for splitting the load between two gears)

F5=36/2=18 kgf (divided by two for splitting the load between two gears)

R1/R2=35 mm

M1=16.5*35=577.5 kgf*mm

M2=18*35=630 kgf*mm

M1+M2 (total moment)=577.5+630=1207 kgf*mm—Moment from FIG. 3 (with the first gear 340 and the second gear 350 of FIG. 3)

Therefore, as detailed above, there is an improved efficiency of the high torque mechanism 300 using a first gear 340 and a second gear 350 as compared to the high torque mechanism 100, 200 without using a first gear or a second gear is higher. The improved efficiency may be calculated at 1207/1155=4.07% improved efficiency for the high torque mechanism 300 using a first gear 340 and a second gear 350 as compared to the high torque mechanism 100, 200 without using a first gear or a second gear.

Figure 5A:
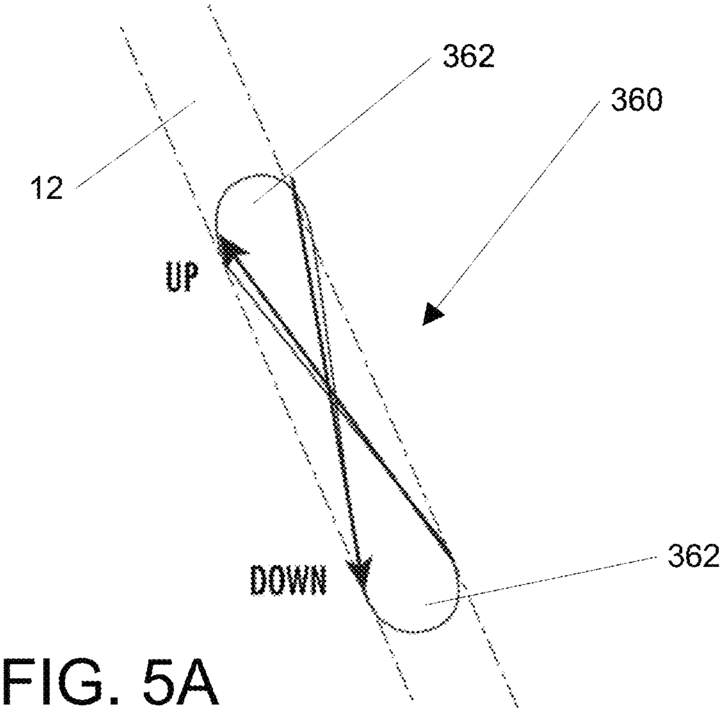
FIG. 5A shows a depiction of a trace of a joint at a low end of a connecting rod from the high torque mechanism of the engine from FIG. 3 in accordance with an embodiment.

Additionally, the high torque mechanism 300 may include another benefit by creating a narrow angle for the movement of the connecting rod 12. FIG. 5A illustrates a trace 360 of the movement of the connecting rod 12 and the first point 312 of the triangular link 310 using the high torque mechanism 300. As illustrated in FIG. 5A, the connecting rod 12 moves up and down in a narrow angle 362 with very little side-to-side movement (almost in a straight line) of the connecting rod 12. The narrow angle 362 of the connecting rod 12 swings may lead to forces on the sides of the cylinder to be low, which can help to reduce the wear of cylinders, pistons, and piston rings within the engine.

Figure 5B:
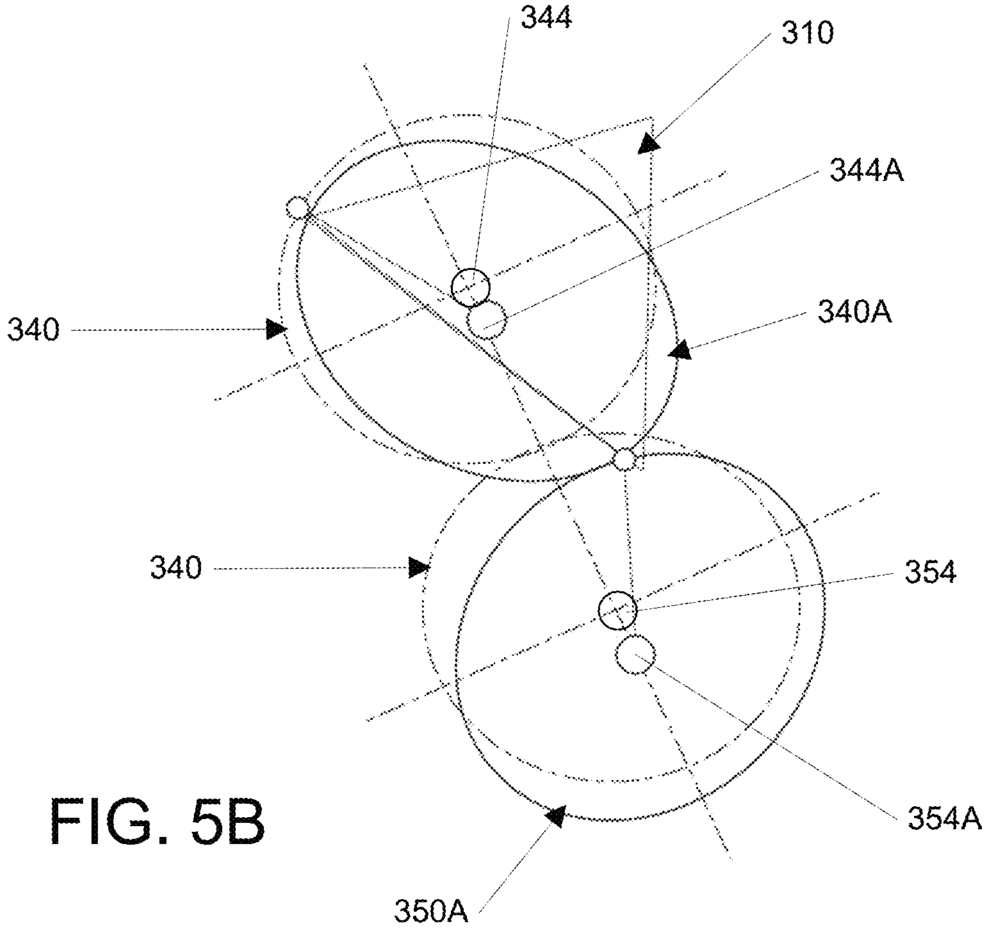
FIG. 5B shows an end view of a first gear and a second gear from the high torque mechanism of the engine from FIG. 3 in accordance with an embodiment.

FIG. 5B illustrates other embodiments of the first gear 340 and the second gear 350 that may be utilized with the high torque mechanism 300. One or both of the first gear 340A and/or the second gear 350A may be an elliptical or oval-shaped gear instead of a round gear 340, 350 as illustrated in FIGS. 3, 4A, and 4B and shown in dotted lines. Additionally, FIGS. 3, 4A, and 4B illustrate the crank pivot point 326 located at a central position 344 of the first gear 340 and the guide pivot point 336 located at a central position 354 of the second gear 350. However, the location of the crank pivot point 326 and the guide pivot point 336 relative to the first gear 340 and the second gear 350 may not be in the central position. As illustrated in FIG. 5B, the crank pivot point 326 may be located in an off-center position 344A to the central position of the first gear 340 and/or the guide pivot point 336 may be located in an off-center position 354A to the central position of the second gear 350. The crank pivot point 326 and/or the guide pivot point 336 may be located below the center positions of the first gear 340 and the second gear 350.

Figure 6:
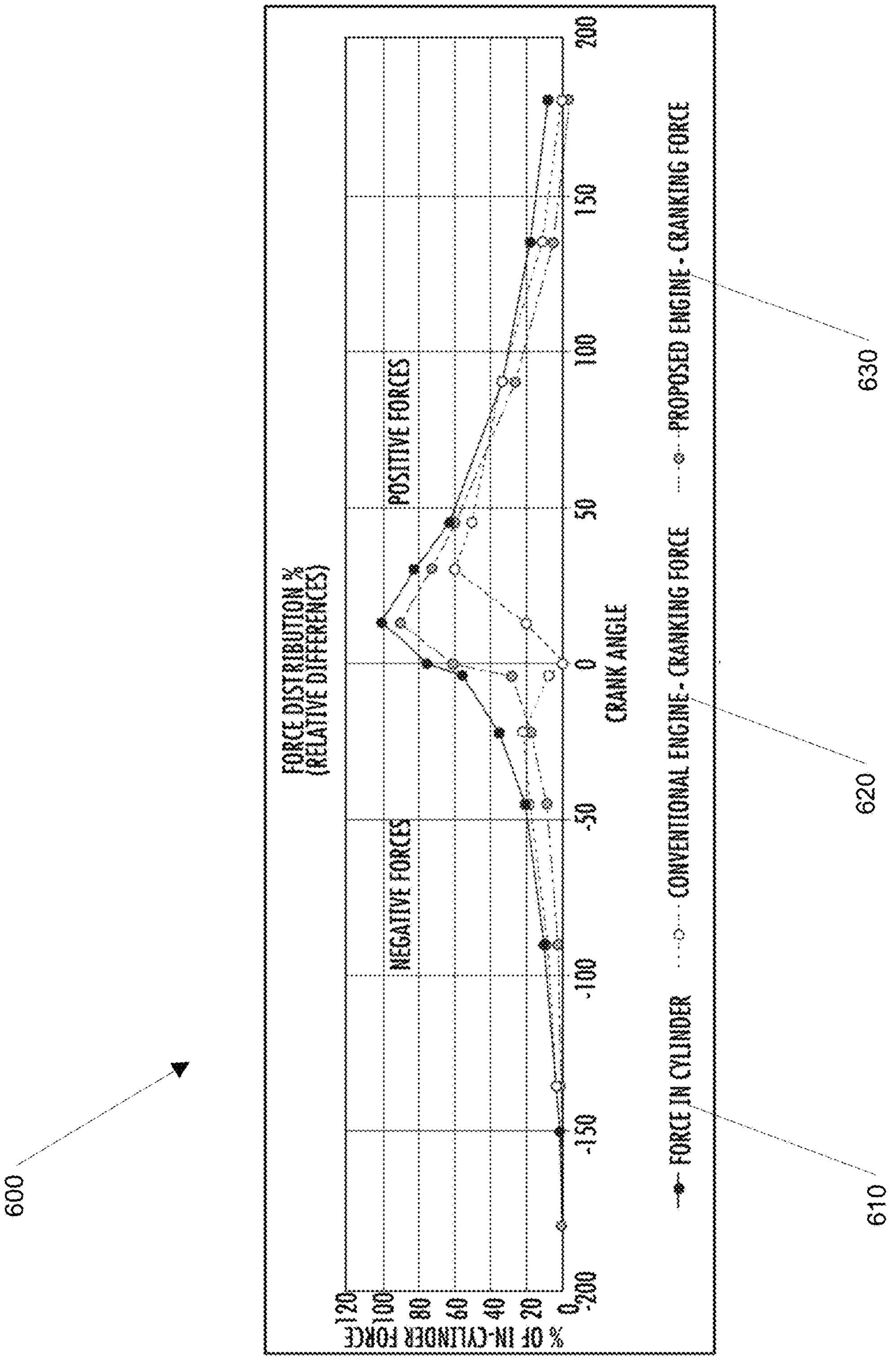
FIG. 6 is a graph of force distribution for forces in a cylinder, cranking force in a conventional engine, and cranking force from a high torque mechanism of an engine in accordance with an embodiment.

FIG. 6 shows a plot of force distribution 600 for forces in a cylinder 610, cranking force in convention design 620, and cranking force from a high torque mechanism 100 of the engine 630. As illustrated in FIG. 6, the engine torque will be considerably higher in the crank range between top down center (TDC) and 45 degrees by using the high torque mechanism 100 with the triangular link 110 and the guide arm 130. The crank range between TCD and 45 degrees may also be the segment with the engine with the high combustion pressure and high forces. For example, as illustrated in FIG. 6, at a TDC or 0 degree crank angle, the force in the cylinder 610 will be 75%, the convention design cranking force 620 will be approximately 0% of the in-cylinder force, but the high torque mechanism 100 cranking force 630 will be approximately 60% of the in-cylinder force. Additionally, at an approximate 15 degree crank angle, the force in the cylinder 610 will be approximately 100%, the convention design cranking force 620 will be approximately 20% of the in-cylinder force, but the high torque mechanism 100 cranking force 630 will be approximately 90% of the in-cylinder force.

For example, using an in-cylinder force of 100 kgf for FIG. 6, below is Table 1 representing the engine torque between TDC and 45 degrees for an engine using the high torque mechanism 100 with the triangular link 110 and the guide arm 130 vs. a conventional engine without the high torque mechanism 100.

TABLE 1

100 kgf In-Cylinder Force (From FIG. 6)

| Crank Angle | Force In Cylinder | Cranking Force—w/ High Torque Mechanism | Cranking Force—w/out High Torque Mechanism | Difference Btw w/High Torque Mechanism and w/out High Torque Mechanism |
|---|---|---|---|---|
| 0 (TDC) | 75 kgf | 60 kgf | 0 kgf | 60 kgf |
| 15 | 100 kgf | 90 kgf | 20 kgf | 70 kgf |
| 30 | 80 kgf | 70 kgf | 60 kgf | 10 kgf |
| 45 | 60 kgf | 60 kgf | 50 kgf | 10 kgf |

Figure 7:
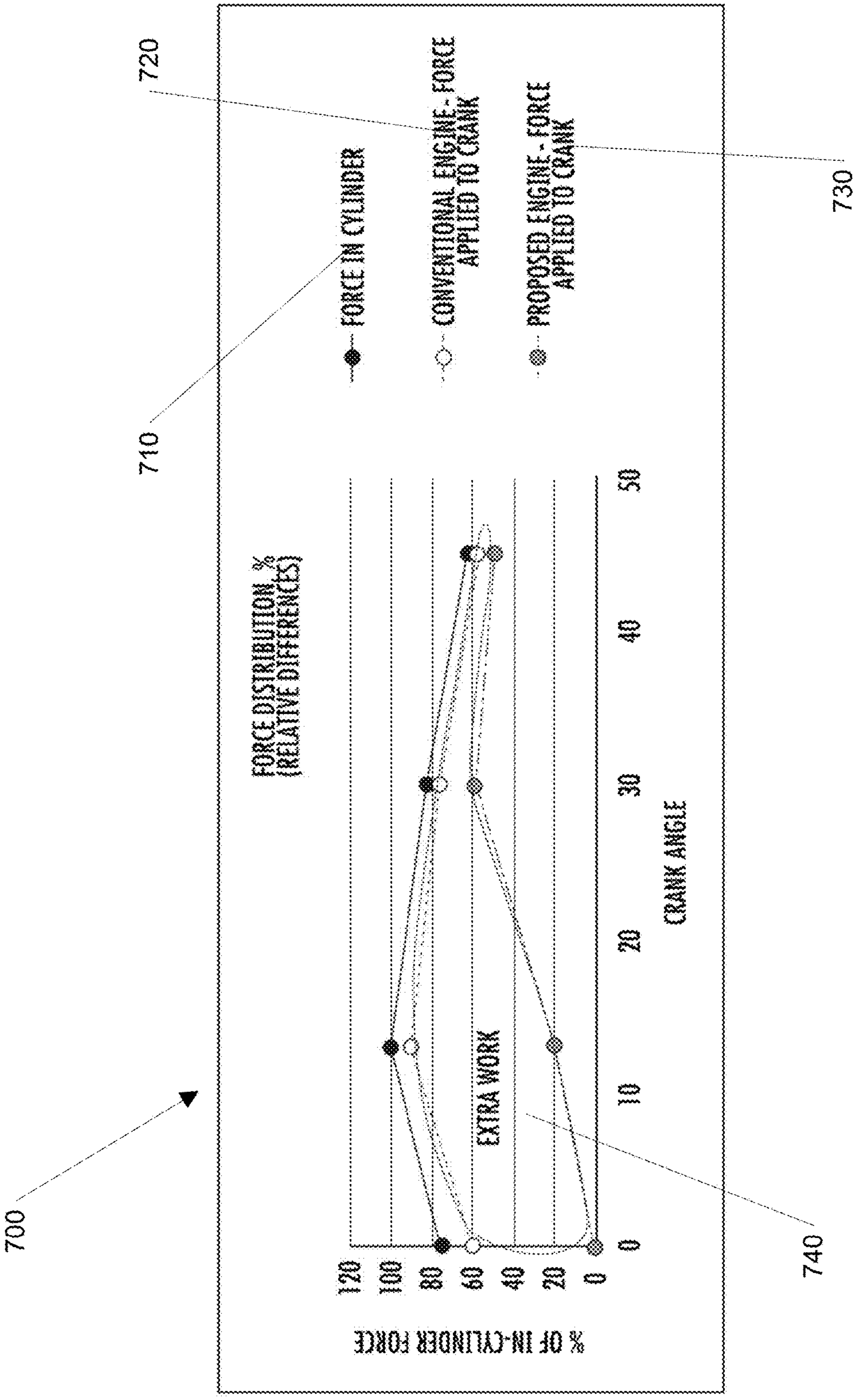
FIG. 7 is a graph of force distribution (for remainder of forces) for forces in a cylinder, cranking force in a conventional engine, and cranking force from a high torque mechanism of an engine in accordance with an embodiment.

FIG. 7 shows a plot of force distribution 700 for approximated remainder of forces ([positive forces] minus [negative forces] from FIG. 6) in a cylinder 710, cranking force in convention design 720, and cranking force from a high torque mechanism 100 of the engine 730. As illustrated in FIG. 7, the engine torque will be considerably higher in the crank range between top down center (TDC) and 45 degrees by using the high torque mechanism 100 with the triangular link 110 and the guide arm 130. FIG. 7 also highlights the extra work 740 that is created and available by using a high torque mechanism 100. The crank range between TCD and 45 degrees may also be the segment with the engine with the high combustion pressure and high forces. For example, as illustrated in FIG. 7, at a TDC or 0 degree crank angle, the force in the cylinder 710 will be 78%, the convention design cranking force 720 will be approximately 0% of the in-cylinder force, but the high torque mechanism 100 cranking force 730 will be approximately 60% of the in-cylinder force. Additionally, at an approximate 15 degree crank angle, the force in the cylinder 710 will be approximately 100%, the convention design cranking force 720 will be approximately 20% of the in-cylinder force, but the high torque mechanism 100 cranking force 730 will be approximately 90% of the in-cylinder force.

For example, using an in-cylinder force of 100 kgf for FIG. 7, below is Table 2 representing the engine torque (remainder of forces of [positive forces] minus [negative forces]) between TDC and 45 degrees for an engine using the high torque mechanism 100 with the triangular link 110 and the guide arm 130 vs. a conventional engine without the high torque mechanism 100.

TABLE 2

100 kgf In-Cylinder Force (From FIG. 7)

| Crank Angle | Force In Cylinder | Cranking Force—w/ High Torque Mechanism | Cranking Force—w/out High Torque Mechanism | Difference Btw w/High Torque Mechanism and w/out High Torque Mechanism |
|---|---|---|---|---|
| 0 (TDC) | 78 kgf | 60 kgf | 0 kgf | 60 kgf |
| 15 | 100 kgf | 90 kgf | 20 kgf | 70 kgf |
| 30 | 80 kgf | 75 kgf | 60 kgf | 15 kgf |
| 45 | 60 kgf | 65 kgf | 50 kgf | 5 kgf |

As described above, the high torque mechanism 100, 200, 300 may make an engine more efficient, reduce fuel consumption, and reduce emissions. The high torque mechanism 100, 200, 300 may be utilized with a vehicle or other end device. The high torque mechanism 100, 200, 300 may also be utilized with a vehicle that includes an on-board fuel container to thereby result in improved fuel consumption so more torque can be outputted by the same amount of fuel stored in the on-board fuel container.

The present technology is disclosed above and in the accompanying drawings with reference to a variety of embodiments. The purpose served by the disclosure, however, is to provide an example of the various features and concepts related to the technology, not to limit its scope. One skilled in the relevant art will recognize that numerous variations and modifications may be made to the embodiments described above without departing from the scope of the present invention, as defined by the appended claims.

We claim:

1. An engine with a piston arranged within a cylinder, the engine comprising:
- a connecting rod having an upper end and a lower end, and being connected at its upper end to the piston;
- a triangular link having a first joint located at a first corner of the triangular link, a second joint located at a second corner of the triangular link, and a third joint located at a third corner of the triangular link, with the first joint connected to the lower end of the connecting rod;
- a guide arm having a first end and a second end, and being connected at its first end to the third joint of the triangular link, and being controlled in rotation thereby about a guide pivot point at the second end, wherein the rotation of the guide arm controls a direction of motion of the triangular link;
- a crankshaft having a first end and a second end and being connected at its first end to the second joint of the triangular link, and being controlled in rotation thereby about a crank pivot point at the second end;
- a first gear connected to the crankshaft at the crank pivot point; and a second gear connected to the guide arm at the guide pivot point, the second gear engaged with the first gear; wherein
- the crank pivot point is located off-center a central position of the first gear.

2. The engine of claim 1, wherein the triangular link includes a window that results in a reduction of mass of the triangular link.

3. The engine of claim 1, wherein the first gear and the second gear are circular.

4. The engine of claim 1, wherein the first gear and the second gear are elliptical.

5. The engine of claim 1, wherein the guide pivot point is located at a central position of the second gear.

6. The engine of claim 1, wherein the guide pivot point is located off-center a central position of the second gear.

7. The engine of claim 1, wherein the engine delivers higher torque than an engine omitting at least the triangular link.

8. The engine of claim 7, wherein for a same amount of requested torque, a fuel consumption of the engine will be lower than the engine omitting at least the triangular link.

9. The engine of claim 1, wherein the connecting rod moves in a narrow angle with the piston movement, thereby minimizing a side force on the cylinder which reduces the wear of the cylinder, the piston, and a ring of the piston.

10. A high torque mechanism for use with an engine with a piston arranged within a cylinder, the high torque mechanism comprising:

a connecting rod having an upper end and a lower end, and being connected at its upper end to the piston;

a three-point link having a first joint located at a first corner of the three-point link, a second joint located at a second corner of the three-point link, and a third joint located at a third corner of the three-point link, with the first joint connected to the lower end of the connecting rod, wherein the three-point link includes a window that results in a reduction of mass of the three-point link;

a guide arm having a first end and a second end, and being connected at its first end to the third joint of the three-point link, and being controlled in rotation thereby about a guide pivot point at the second end, wherein the rotation of the guide arm controls a direction of motion of the three-point link;

a crankshaft having a first end and a second end, and being connected at its first end to the second joint of the three-point link, and being controlled in rotation thereby about a crank pivot point at the second end;

a first gear connected to the crankshaft at the crank pivot point; and a second gear connected to the guide arm at the guide pivot point, the second gear engaged with the first gear; wherein the crank pivot point is located off-center a central position of the first gear and the guide pivot point is located off-center a central position of the second gear.

11. The high torque mechanism of claim 10, wherein the first gear and the second gear are one of circular or elliptical.

12. The high torque mechanism of claim 10, wherein the engine delivers higher torque than an engine omitting at least the three-point link.

13. A vehicle with a high-torque engine and on-board fuel container, the high-torque engine comprising:

a piston arranged within a cylinder;

a connecting rod having an upper end and a lower end, and being connected at its upper end to the piston;

a triangular link having a first joint located at a first corner of the triangular link, a second joint located at a second corner of the triangular link, and a third joint located at a third corner of the triangular link, with the first joint connected to the lower end of the connecting rod;

a guide arm having a first end and a second end, and being connected at its first end to the third joint of the triangular link, and being controlled in rotation thereby about a guide pivot point at the second end, wherein the rotation of the guide arm controls a direction of motion of the triangular link; and a crankshaft having a first end and a second end, and being connected at its first end to the second joint of the triangular link, and being controlled in rotation thereby about a crank pivot point at the second end;

a first gear connected to the crankshaft at the crank pivot point; and a second gear connected to the guide arm at the guide pivot point, the second gear engaged with the first gear; wherein the crank pivot point is located off-center a central position of the first gear.

14. The vehicle of claim 13, wherein the triangular link includes a window that results in a reduction of mass of the triangular link.

* * * * *